US012722176B2

(12) United States Patent
Shan et al.

(10) Patent No.: US 12,722,176 B2

(45) Date of Patent: Sep. 1, 2026

(54) QUICK DISASSEMBLY AND ASSEMBLY STRUCTURE OF SHOWER HEAD

(71) Applicant: NINGBO NEW ART SANITARY WARE CO., LTD., Ningbo (CN)

(72) Inventors: Jianbo Shan, Ningbo (CN); Shen Liao, Ningbo (CN); Ronghua Lin, Ningbo (CN)

(73) Assignee: NINGBO NEW ART SANITARY WARE CO., LTD., Ningbo (CN)

( * ) Notice: Subject to any disclaimer, the term of this patent is extended or adjusted under 35 U.S.C. 154(b) by 205 days.

(21) Appl. No.: 18/650,598

(22) Filed: Apr. 30, 2024

(65) Prior Publication Data

US 2024/0278279 A1 Aug. 22, 2024

Related U.S. Application Data

(63) Continuation of application No. PCT/CN2021/134727, filed on Dec. 1, 2021.

(51) Int. Cl.

*B05B 15/62* (2018.01)

*E03C 1/04* (2006.01)

(52) U.S. Cl.

CPC ............ *B05B 15/62* (2018.02); *E03C 1/0408* (2013.01)

(58) Field of Classification Search

CPC ........... B05B 1/18; B05B 1/185; B05B 15/62; E03C 1/06

See application file for complete search history.

(56) References Cited

FOREIGN PATENT DOCUMENTS

| | | | | |
|---|---|---|---|---|
| CN | 206526961 U | | 9/2017 | |
| CN | 113318896 | * | 8/2021 | ............ B05B 15/62 |

* cited by examiner

*Primary Examiner* — Christopher R Dandridge

(74) *Attorney, Agent, or Firm* — Westbridge IP LLC

(57) ABSTRACT

A quick disassembly and assembly structure of a shower head includes a shower head main body, a side of the shower head main body away from a water outlet cover being provided with a mounting portion; and a fixed base provided with a connecting portion correspondingly. One of the mounting portion and the connecting portion is provided with a movable member, the other of the mounting portion and the connecting portion is provided with a control unit. The control unit comprises a limiting member and a guide member; when the shower head main body moves to a first position, the shower head main body is fixedly mounted on the fixed base; when the shower head main body moves to a second position; which is convenient to operate, labor-saving, simple in structure, and stable in function.

9 Claims, 7 Drawing Sheets

QUICK DISASSEMBLY AND ASSEMBLY STRUCTURE OF SHOWER HEAD

CROSS-REFERENCE TO RELATED APPLICATIONS

This application is a continuation of International Application No. PCT/CN2021/134727, filed on Dec. 1, 2021, the content of which is incorporated herein by reference in its entirety.

TECHNICAL FIELD

The present disclosure herein relates to the technical field of sanitary ware, and particularly relates to a quick disassembly and assembly structure of a shower head thereof.

BACKGROUND

The current mounting structure of the shower head is usually mounted on the wall with a fixed base, which is provided with a hanging hole, and the shower head is hung at the hanging hole. When using it, the shower head is removed from the hanging hole. However, the connection between the shower head and the hanging hole is not reliable, when the shower head is not mounted in place, the shower head can easily fall out of the hanging hole, which is dangerous, and falling of the shower head can easily cause damage.

SUMMARY

The present disclosure provides a quick disassembly and assembly structure of a shower head. This solution realizes quick assembly of the shower head body by pressing the shower head body to the first position, and then realizes quick disassembly of the shower head body by pressing the shower head body to the second position, which is convenient to operate, labor-saving, simple in structure, and stable in function.

In order to achieve the above object, the technical solution adopted by the present disclosure is: a quick disassembly and assembly structure of a shower head, including:

- a shower head main body has a water outlet channel and a water outlet cover, the water outlet cover is provided with a number of water outlet holes connected with the water outlet channel, and a side of the shower head main body away from the water outlet cover is provided with a mounting portion;
- a fixed base has a water supply channel connected with the water outlet channel, and the fixed base is provided with a connecting portion correspondingly;
- one of the mounting portion and the connecting portion is provided with a movable member, and the other of the mounting portion and the connecting portion is provided with a control unit, and the control unit comprises a limiting member and a guide member;
- when the shower head main body moves to the first position, the movable member moves to a limiting position that is limited and matched with the limiting member, and then the shower head main body is fixedly mounted on the fixed base;
- when the shower head main body moves to the second position, the movable member moves to a yielding position that matches the limiting member under the action of the guide member, thereby separating the shower head main body from the fixed base.

Preferably, the quick disassembly and assembly structure further comprises a first elastic member that provides elastic force to the movable member, and the movable member reciprocates between the limiting position and the yielding position under the action of the first elastic member.

Preferably, the movable member is provided with a first guide surface, and in a process of the shower head main body moves to the first position, the movable member moves to the yielding position under the action of the first guide surface; when the movable member crosses the limiting member, the movable member is reset to the limiting position under the action of the first elastic member, and then limitingly cooperates with the limiting member.

Preferably, the limiting member is provided with a first matching slope corresponding to the first guide surface, and in the process of the shower head main body moves to the first position, the movable member moves to the yielding position under the action of the first guide surface and the first matching slope.

Preferably, a side of the guide member away from the limiting member is provided with a second guide surface, and in the process of the shower head main body moves from the first position to the second position, the movable member moves to the yielding position under the action of the first guide surface, and when the movable member crosses the guide member, the movable member is reset to the limiting position under the action of the first elastic member, and at this time, the movable member moves to the yielding position under the action of the second guide surface.

Preferably, a side of the guide member facing the limiting member is provided with a second matching slope that guides and cooperates with the first guide surface, and in the process of the shower head main body moves from the first position to the second position, the movable member moves to the yielding position under the action of the first guide surface and the second matching slope.

Preferably, the guide member is movably arranged relative to the limiting member, and when the shower head main body moves to the first position, the guide member is separated from the limiting member to form a gap for the movable member to snap in; when the shower head main body moves to the second position, the guide member is in contact with the limiting member, thereby eliminating the gap.

Preferably, between the limiting member and the guide member is provided with a second elastic member, and the guide member is arranged to reciprocate between the position where they are in contact with and separated from the limiting member under the action of the second elastic member.

Preferably, the mounting portion is a concave cavity recessed inward, the shower head main body is further provided with an assembly cavity cross-communicated with the concave cavity, and the movable member is movably mounted in the assembly cavity and moves along the radial direction of the concave cavity.

Preferably, the connecting portion is a plug-in shaft that is plug-fitted with the concave cavity, and the limiting member and the guide member are all arranged on the plug-in shaft.

The present disclosure has the following beneficial effects.

The quick disassembly and assembly structure of the shower head of the present disclosure comprises a shower head main body, a side of the shower head main body away from a water outlet cover being provided with a mounting portion; a fixed base, the fixed base being provided with a connecting portion correspondingly. One of the mounting portion and the connecting portion is provided with a movable member, and the other of the mounting portion and the connecting portion is provided with a control unit. The control unit comprises a limiting member and a guide member; when the shower head main body moves to the first position, the movable member moves to a limiting position that is limited and matched with the limiting member, and then the shower head main body is fixedly mounted on the fixed base; when the shower head main body moves to the second position, the movable member moves to a yielding position that matches the limiting member under the action of the guide member, thereby separating the shower head main body from the fixed base. This solution realizes quick assembly of the shower head body by pressing the shower head body to the first position, and then realizes quick disassembly of the shower head body by pressing the shower head body to the second position, which is convenient to operate, labor-saving, simple in structure, and stable in function.

BRIEF DESCRIPTION OF THE DRAWINGS

The drawings described here are used to provide a further understanding of the present disclosure and constitute a part of the present disclosure. The illustrative embodiments of the present disclosure and their descriptions are used to explain the present disclosure and do not constitute an improper limitation of the present disclosure. In the accompanying drawings.

DETAILED DESCRIPTION OF THE EMBODIMENTS

Figure 1:
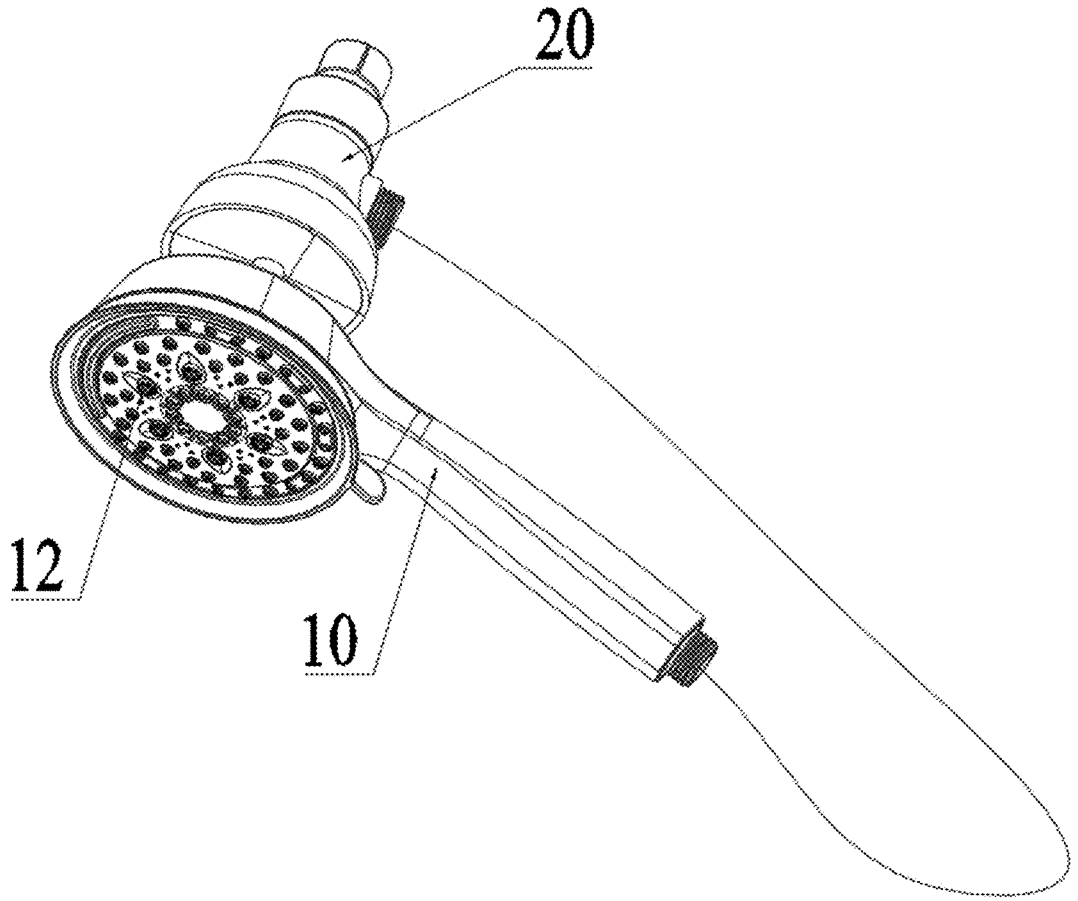
FIG. 1 is one of the assembly views of a quick disassembly and assembly structure of a shower head according to the present disclosure.
Figure 2:
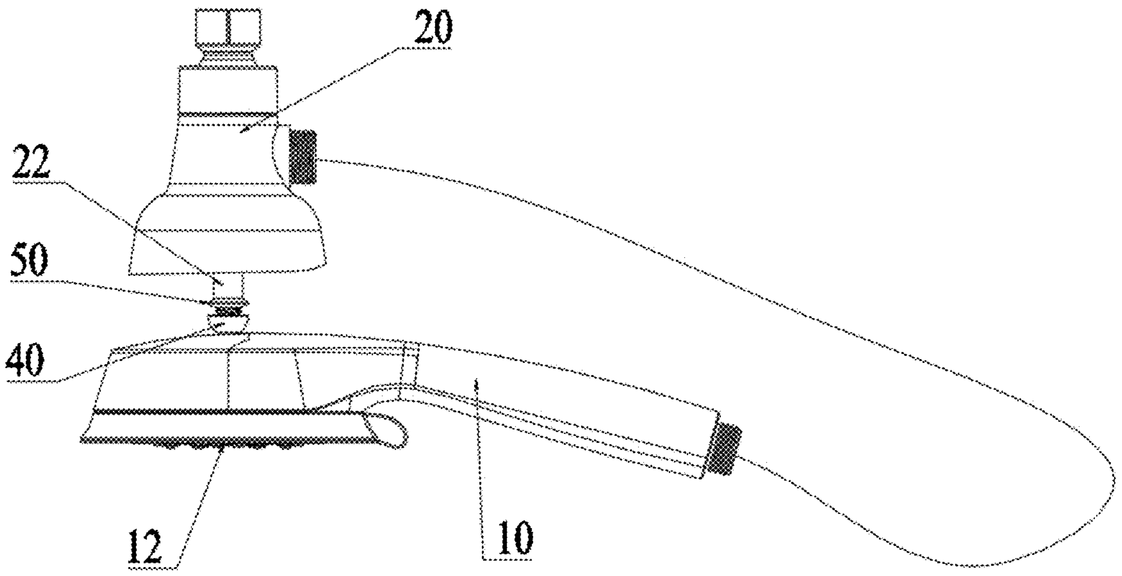
FIG. 2 is the second assembly views of a quick disassembly and assembly structure of a shower head according to the present disclosure.
Figure 3:
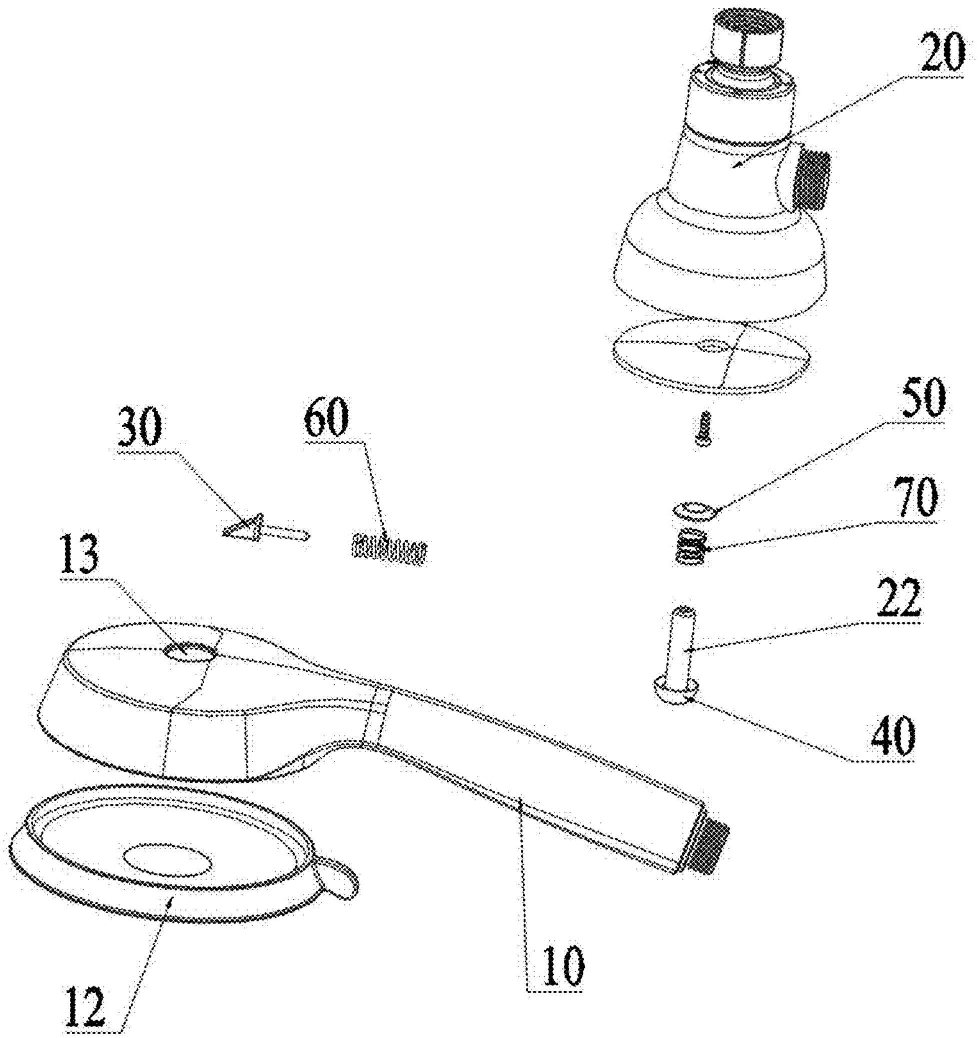
FIG. 3 is an exploded view of a quick disassembly and assembly structure of a shower head according to the present disclosure.

In order to make the technical problems, technical solutions and beneficial effects to be solved by the present disclosure clearer and more understandable, the present disclosure will be further described in detail below with reference to the accompanying drawings and embodiments. It should be understood that the specific embodiments described here are only used to explain the present disclosure and are not intended to limit the present disclosure.

As shown in FIG. 1 to FIG. 7, in a quick disassembly and assembly structure of a shower head, a shower head main body 10 has a water outlet channel 11 and a water outlet cover 12, the water outlet cover 12 is provided with a number of water outlet holes connected with the water outlet channel 11, and a side of the shower head main body 10 away from the water outlet cover 12 is provided with a mounting portion 13.

A fixed base 20 has a water supply channel 21 connected with the water outlet channel 11, and the fixed base 20 is provided with a connecting portion 22 correspondingly.

One of the mounting portion 13 and the connecting portion 22 is provided with a movable member 30, and the other of the mounting portion 13 and the connecting portion 22 is provided with a control unit, and the control unit comprises a limiting member 40 and a guide member 50.

When the shower head main body 10 moves to the first position, the movable member 30 moves to a limiting position that is limited and matched with the limiting member 40, and then the shower head main body 10 is fixedly mounted on the fixed base 20.

When the shower head main body 10 moves to the second position, the movable member 30 moves to a yielding position that matches the limiting member 40 under the action of the guide member 50, thereby separating the shower head main body 10 from the fixed base 20.

In this embodiment, the quick disassembly and assembly structure further comprises a first elastic member 60 that provides elastic force to the movable member 30, and the movable member 30 reciprocates between the limiting position and the yielding position under the action of the first elastic member 60. Specifically, the first elastic member 60 adopts a return spring.

In this embodiment, the movable member 30 is provided with a first guide surface 31, and in the process of the shower head main body 10 moves to the first position, the movable member 30 moves to the yielding position under the action of the first guide surface 31; when the movable member 30 crosses the limiting member 40, the movable member 30 is reset to the limiting position under the action of the first elastic member 60, and then limitingly cooperates with the limiting member 40.

In this embodiment, the limiting member 40 is provided with a first matching slope 41 corresponding to the first guide surface 31, and in the process of the shower head main body 10 moves to the first position, the movable member 30 moves to the yielding position under the action of the first guide surface 31 and the first matching slope 41.

In this embodiment, a side of the guide member 50 away from the limiting member 40 is provided with a second guide surface 51, and in the process of the shower head main body 10 moves from the first position to the second position, the movable member 30 moves to the yielding position under the action of the first guide surface 31, and when the movable member 30 crosses the guide member 50, the movable member 30 is reset to the limiting position under the action of the first elastic member 60, and at this time, the movable member 30 moves to the yielding position under the action of the second guide surface 51.

In this embodiment, a side of the guide member 50 facing the limiting member 40 is provided with a second matching slope 52 that guides and cooperates with the first guide surface 31, and in the process of the shower head main body 10 moves from the first position to the second position, the movable member 30 moves to the yielding position under the action of the first guide surface 31 and the second matching slope 52.

In this embodiment, the guide member 50 is movably arranged relative to the limiting member 40, and when the shower head main body 10 moves to the first position, the guide member 50 is separated from the limiting member 40 to form a gap for the movable member 30 to snap in; when the shower head main body 10 moves to the second position, the guide member 50 is in contact with the limiting member 40, thereby eliminating the gap. Specifically, a side of the limiting member 40 facing the guide member 50 is provided with a groove 42 that fits the second matching slope 52, and when the guide member 50 and the limiting member 40 are in contact, the second matching slope 52 embed into the groove 42, whereby the guide member 50 and the limiting member 40 are completely fitted.

In this embodiment, between the limiting member 40 and the guide member 50 is provided with a second clastic member 70, and the guide member 50 is arranged to reciprocate between the position where they are in contact with and separated from the limiting member 40 under the action of the second elastic member 70.

In this embodiment, the mounting portion 13 is a concave cavity recessed inward, the shower head main body 10 is further provided with an assembly cavity 14 cross-communicated with the concave cavity, and the movable member 30 is movably mounted in the assembly cavity 14 and moves along the radial direction of the concave cavity.

In this embodiment, the connecting portion 22 is a plug-in shaft that is plug-fitted with the concave cavity, and the limiting member 40 and the guide member 50 are all arranged on the plug-in shaft.

The specific working process of this embodiment is as follows.

Figure 4:
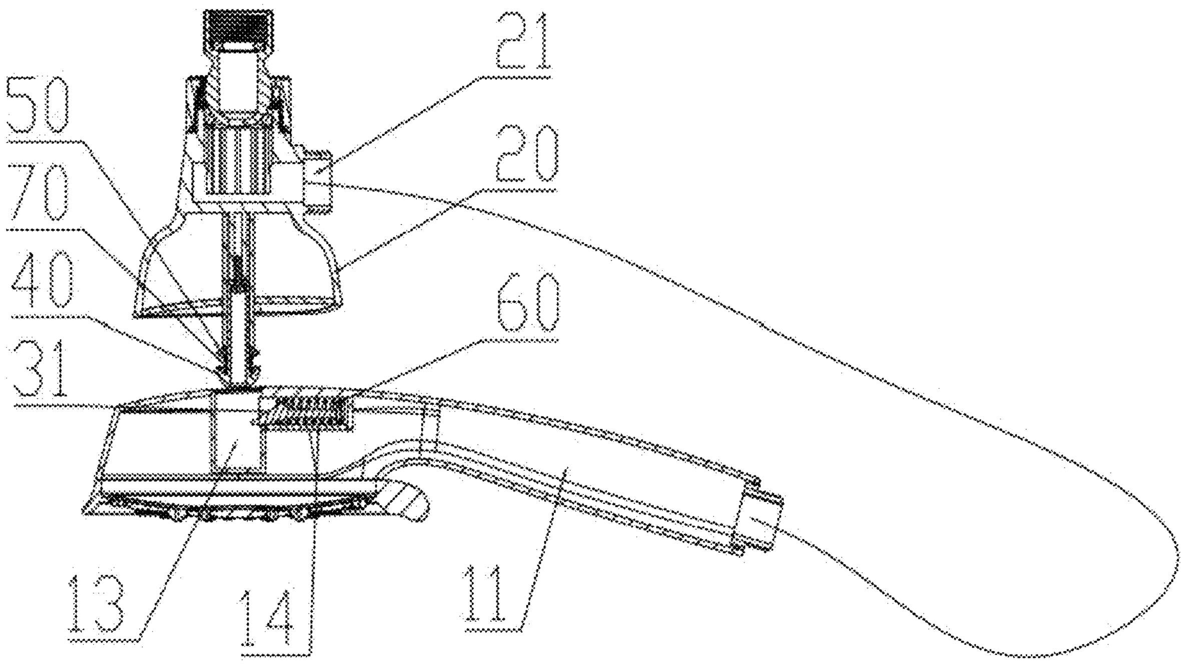
FIG. 4 is one of the cross-sectional views of the mounting process of a quick disassembly and assembly structure of a shower head according to the present disclosure.
Figure 5:
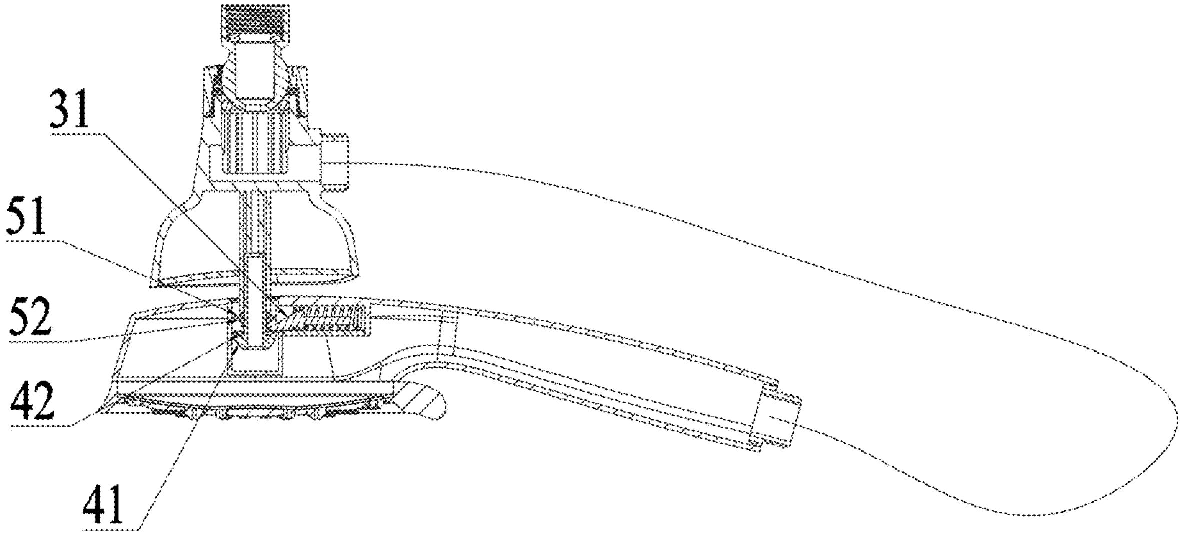
FIG. 5 is the second cross-sectional view of the mounting process of a quick disassembly and assembly structure of a shower head according to the present disclosure (when the shower head body moves to the first position)
Figure 6:
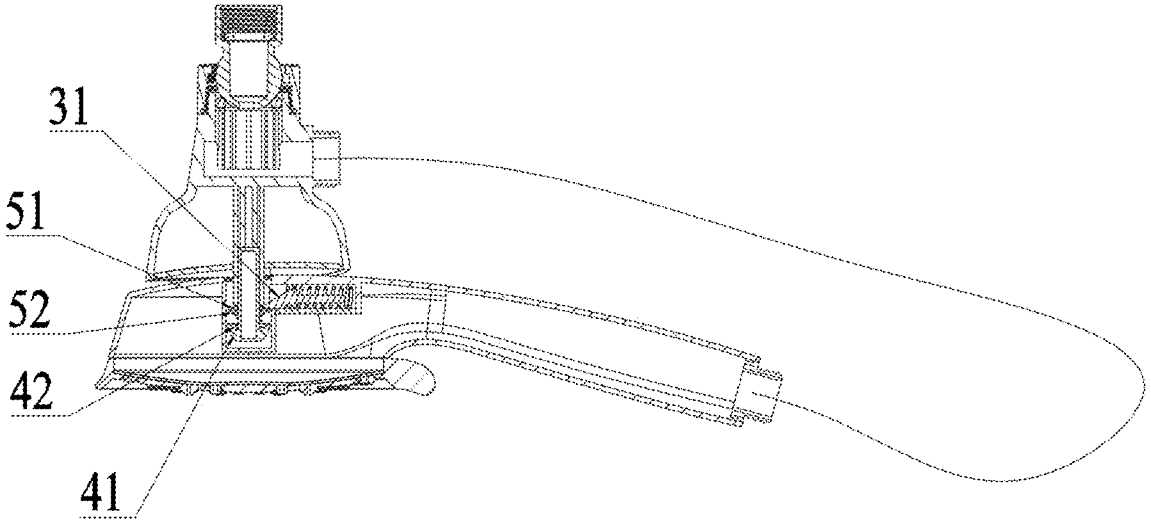
FIG. 6 is one of the cross-sectional views of the disassembly process of a quick disassembly and assembly structure of a shower head according to the present disclosure.
Figure 7:
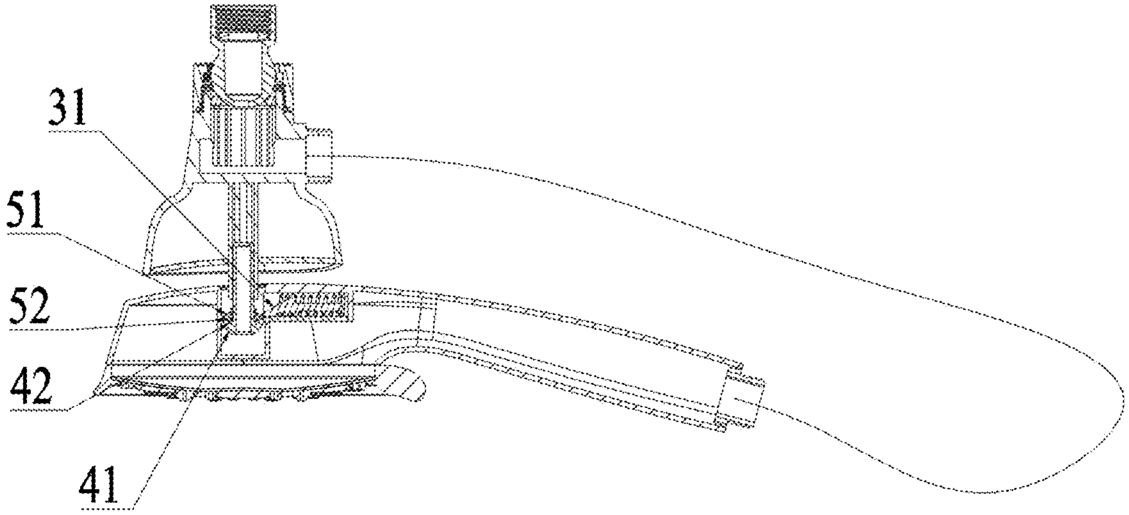
FIG. 7 is the second cross-sectional view of the disassembly process of a quick disassembly and assembly structure of a shower head according to the present disclosure (when the shower head main body moves to the second position).

During mounting, as shown in FIGS. 4 and 5, the shower head main body 10 is driven to move to the first position, and the movable member 30 moves to the yielding position under the action of the first guide surface 31 and the first matching slope 41, until the movable member 30 crosses the limiting member 40, the movable member 30 is reset to the limiting position under the action of the first elastic member 60, and then limitingly cooperates with the limiting member 40 to fix the shower head main body 10 connected to the fixed base 20;

During disassembly, as shown in FIGS. 6 and 7, the shower head main body 10 is driven to move from the first position to the second position, and the movable member 30 moves to the yielding position under the action of the first guide surface 31 and the second matching slope 52; when the movable member 30 crosses the guide member 50, the movable member 30 is reset to the limiting position under the action of the first elastic member 60, and at this time, the guide member 50 moves toward the direction close to the limiting member 40 under the action of the movable member 30 and compresses the second elastic member 70 to fit with the limiting member 40. At the same time, the movable member 30 moves to the yielding position under the action of the second guide surface 51, and at this time, the shower head body can be separated from the fixed base 20, and then the shower head body can be removed.

This solution realizes quick assembly of the shower head body by pressing the shower head body to the first position, and then realizes quick disassembly of the shower head body by pressing the shower head body to the second position, which is convenient to operate, labor-saving, simple in structure, and stable in function.

The above description shows and describes the preferred embodiments of the present disclosure. As mentioned above, it should be understood that the present disclosure is not limited to the form disclosed herein and should not be regarded as excluding other embodiments, but can be used in various other combinations, modifications and environments, and can be modified through the above teachings or technology or knowledge in related arts within the scope of the inventive concept described herein. Any modifications and changes made by those skilled in the art that do not depart from the spirit and scope of the present disclosure shall be within the protection scope of the appended claims of the present disclosure.

What is claimed is:

1. A quick disassembly and assembly structure of a shower head, comprising:

a shower head main body having a water outlet channel and a water outlet cover, wherein the water outlet cover is provided with a number of water outlet holes connected with the water outlet channel, and a side of the shower head main body away from the water outlet cover is provided with a mounting portion; and a fixed base having a water supply channel connected with the water outlet channel, wherein the fixed base is provided with a connecting portion correspondingly;

wherein, one of the mounting portion and the connecting portion is provided with a movable member, and the other of the mounting portion and the connecting portion is provided with a control unit, and the control unit comprises a limiting member and a guide member;

when the shower head main body moves to a first position, the movable member moves to a limiting position that is limited and matched with the limiting member, and then the shower head main body is fixedly mounted on the fixed base; and when the shower head main body moves to a second position, the movable member moves to a yielding position that matches the limiting member under the action of the guide member, thereby separating the shower head main body from the fixed base;

wherein the guide member is movably arranged relative to the limiting member, and when the shower head main body moves to the first position, the guide member is separated from the limiting member to form a gap for the movable member to snap in; when the shower head main body moves to the second position, the guide member is in contact with the limiting member, thereby eliminating the gap.

2. The quick disassembly and assembly structure of the shower head according to claim 1, further comprising a first elastic member that provides elastic force to the movable member, wherein the movable member reciprocates between the limiting position and the yielding position under the action of the first elastic member.

3. The quick disassembly and assembly structure of the shower head according to claim 2, wherein the movable member is provided with a first guide surface, and in a process of the shower head main body moves to the first position, the movable member moves to the yielding position under the action of the first guide surface; when the movable member crosses the limiting member, the movable member is reset to the limiting position under the action of the first elastic member, and then limitingly cooperates with the limiting member.

4. The quick disassembly and assembly structure of the shower head according to claim 3, wherein the limiting member is provided with a first matching slope corresponding to the first guide surface, and in the process of the shower head main body moves to the first position, the movable member moves to the yielding position under the action of the first guide surface and the first matching slope.

5. The quick disassembly and assembly structure of the shower head according to claim 3, wherein a side of the guide member away from the limiting member is provided with a second guide surface, and in the process of the shower head main body moves from the first position to the second position, the movable member moves to the yielding position under the action of the first guide surface, and when the movable member crosses the guide member, the movable member is reset to the limiting position under the action of the first elastic member, and at this time, the movable member moves to the yielding position under the action of the second guide surface.

6. The quick disassembly and assembly structure of the shower head according to claim 5, wherein a side of the guide member facing the limiting member is provided with a second matching slope that guides and cooperates with the first guide surface, and in the process of the shower head main body moves from the first position to the second position, the movable member moves to the yielding position under the action of the first guide surface and the second matching slope.

7. The quick disassembly and assembly structure of the shower head according to claim 1, wherein between the limiting member and the guide member is provided with a second elastic member, and the guide member is arranged to reciprocate between the position where they are in contact with and separated from the limiting member under the action of the second elastic member.

8. The quick disassembly and assembly structure of the shower head according to claim 1, wherein the mounting portion is a concave cavity recessed inward, the shower head main body is further provided with an assembly cavity cross-communicated with the concave cavity, and the movable member is movably mounted in the assembly cavity and moves along the radial direction of the concave cavity.

9. The quick disassembly and assembly structure of the shower head according to claim 8, wherein the connecting portion is a plug-in shaft that is plug-fitted with the concave cavity, and the limiting member and the guide member are all arranged on the plug-in shaft.

* * * * *